United States Patent [19]
Press

[11] 3,791,617
[45] Feb. 12, 1974

[54] POSITIVE OPENING AND CLOSING CONSTRICTABLE TUBE VALVE WITH MEANS FOR PROLONGING TUBE LIFE

[75] Inventor: Irving D. Press, West Orange, N.J.

[73] Assignee: Resistoflex Corporation, Roseland, N.J.

[22] Filed: July 14, 1971

[21] Appl. No.: 162,407

[52] U.S. Cl. .................. 251/8, 137/556, 264/151
[51] Int. Cl. .................................................. F16k 7/06
[58] Field of Search ................................. 251/4–10

[56] References Cited
UNITED STATES PATENTS

| | | | |
|---|---|---|---|
| 143,907 | 10/1873 | Hyde | 251/7 |
| 2,467,150 | 4/1949 | Nordell | 251/5 |
| 3,482,267 | 12/1969 | Liljendahl | 251/5 |
| 3,612,475 | 10/1971 | Dinger | 251/10 |

FOREIGN PATENTS OR APPLICATIONS

| | | | |
|---|---|---|---|
| 582,032 | 11/1946 | Great Britain | 251/8 |
| 693,028 | 6/1953 | Great Britain | 251/8 |
| 1,040,349 | 8/1966 | Great Britain | 251/5 |

*Primary Examiner*—Martin P. Schwadron
*Assistant Examiner*—Richard Gerard
*Attorney, Agent, or Firm*—Watson Leavenworth Kelton & Taggart

[57] ABSTRACT

Notched edge clamps cooperate with lateral extensions on the compressor members for ensuring sealing while the clamps have smoothly rounded diverging mouths for preventing crack inducing flexure of the tube in a constrictable tube valve. A limber wishbone shaped yoke maintains sealing pressure. Wings on the compressor members with transition curves guide the tube during flexure. Connections with lost motion between bosses on the tube and respective wings provide positive opening. Resilient extensions are provided on a modification of the compressor members. The tube and bosses are formed by extruding a tube with longitudinal ribs and then machining away the undesired sections of the ribs.

20 Claims, 14 Drawing Figures

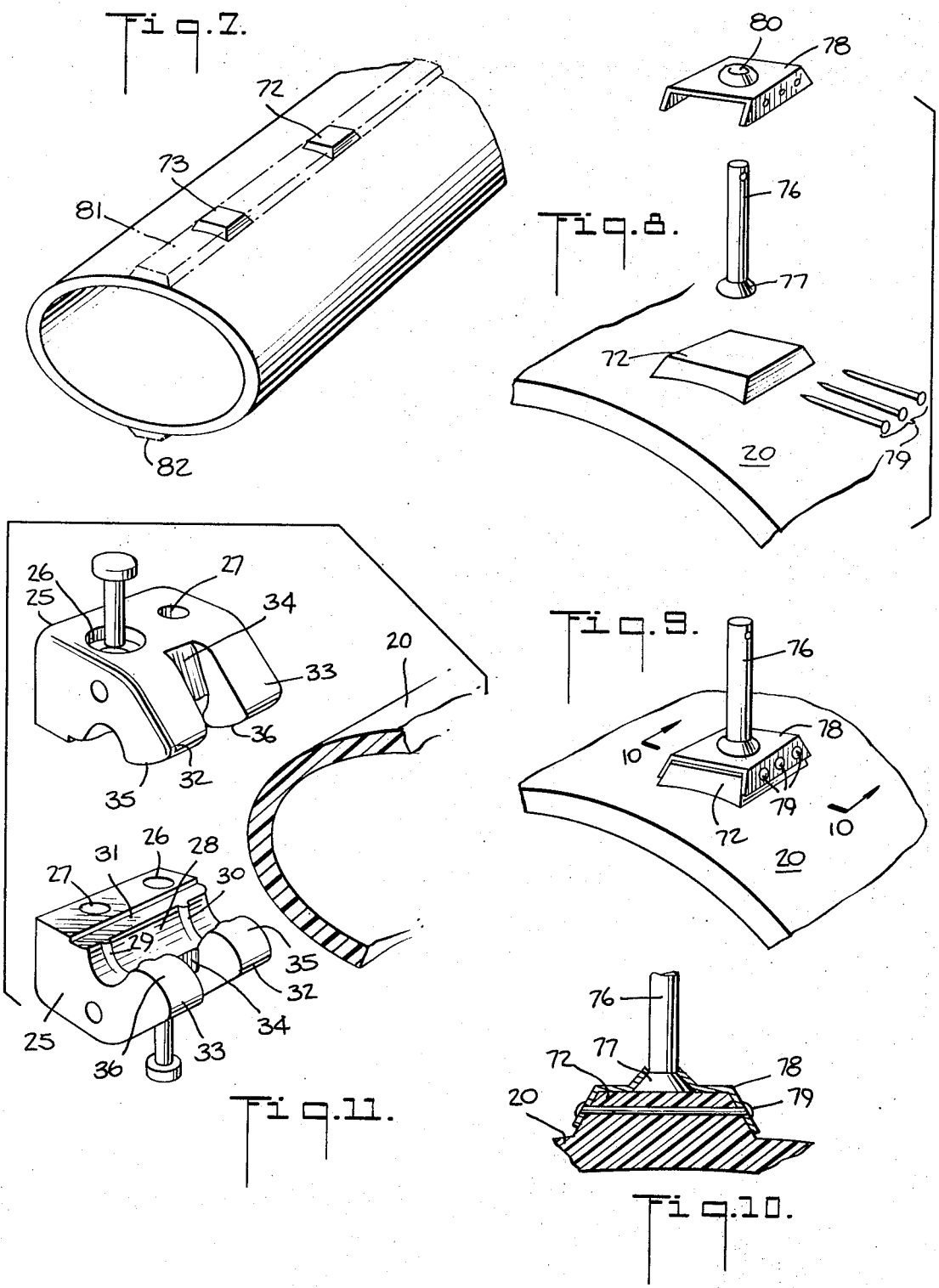

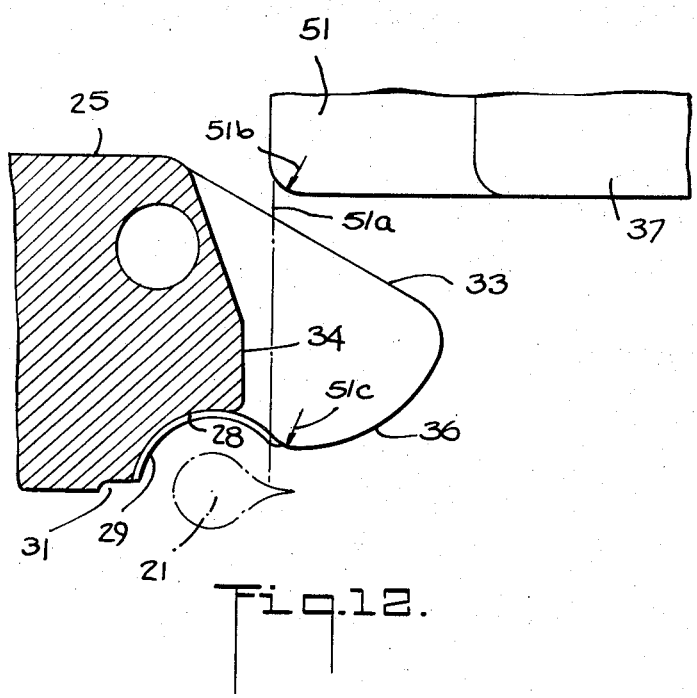
Fig.12.
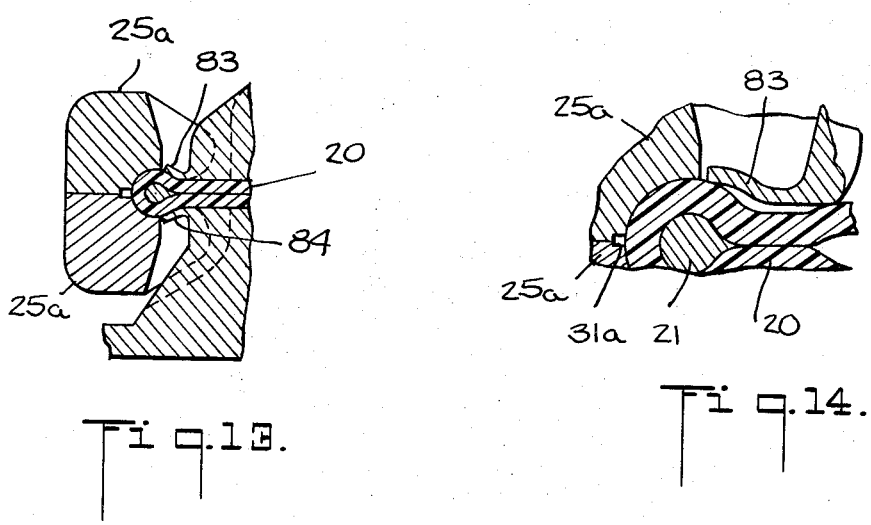
Fig.13.
Fig.14.

POSITIVE OPENING AND CLOSING CONSTRICTABLE TUBE VALVE WITH MEANS FOR PROLONGING TUBE LIFE

The present invention relates to fluid valves and, more particularly, to a valve of the type in which a constrictable tube is mechanically flattened to form a barrier to the flow of fluid material therethrough.

In my copending application Ser. No. 126,436 filed Mar. 22, 1971, now U.S. Pat. No. 3,733,046 for "CONSTRICTABLE TUBE VALVE," and assigned to the same assignee as the present application, there is described and claimed a constrictable valve of the foregoing type. As explained in said copending application, clamps are disposed at opposite edges of the tube to maintain regions at each edge of the tube in constantly constricted fluid sealing condition free from crack inducing flexure. In the preferred embodiment, the sidewall of the tube is secured in sealing embrace about a smoothly curving filler piece. Closure of the valve is accomplished by means of a pair of compressor members for constricting the tube between the edge clamps.

While incorporation of the edge clamps as described in my aforesaid application avoids cracking at the side edges of the tube, valves so constructed showed a tendency for cracks to develop elsewhere in the tube. It is, therefore, an object of the present invention to provide a constrictable tube valve which is even less sensitive to crack induced failure than the valve disclosed in my aforesaid application.

The valve disclosed in my aforesaid application made use of internal fluid pressure or the elasticity of the tube to bring about opening of the tube passage when the compressors were moved apart. Hence, the valve could not handle fluid under negative or vacuum pressure conditions and was slow to respond to low positive pressure. Therefore, it is a further object of the present invention to provide a constrictable tube valve with positive means for opening the valve.

In order to enable the valve to handle abrasive or corrosive materials, it is desirable to construct the tube element from polytetrafluoroethylene resin (P.T.F.E.) or similar plastic. However, such material is subject to cold flow, a phenomenon well known to those skilled in the art. Hence, it is a still further object of the present invention to provide a constrictable valve configuration which is arranged to maintain its sealing integrity, when it is supposed to be closed, in spite of any cold flow that might occur in the tube material.

Further objects and advantages of the invention will be apparent to those skilled in the art after reading the following detailed description of the presently preferred embodiment of the invention with reference to the accompanying drawings in which:

FIG. 7 is a perspective view of the unassembled tube element employed in the valve before attachment of the connecting elements;

FIG. 8 is an exploded fragmentary view showing the components which make up a connecting element connected to the tube;

FIG. 9 is a fragmentary perspective view showing the assembly of the components of FIG. 8;

FIG. 10 is a fragmentary sectional view taken along the line 10—10 in FIG. 9;

FIG. 11 is a fragmentary exploded view showing the two halves of an edge clamp as employed in the present embodiment;

FIG. 12 is a fragmentary sectional view taken along the line 13—13 in FIG. 2 but with the parts displaced and drawn to an enlarged scale for clarity;

FIG. 13 is a fragmentary sectional view taken in the region designated by line 13—13 in FIG. 2 but showing a modification of the compressor elements; and FIG. 14 is a fragmentary sectional view of a portion of FIG. 13 showing the valve components in slightly open condition.

The same reference numerals are used throughout the drawings to designate the same or similar parts.

Referring now to FIGS. 1 through 12 of the drawings, the valve housing is shown generally at 10, consisting of two identical halves 11 and 12 joined along the longitudinal line 13 by the bolts 14, 15, 16 and 17. When assembled, the housing has end flanges 18 and 19. A constrictable tube 20 is disposed between the end flanges 18 and 19 with the ends flared over the faces thereof. While the tube 20 need not be monolithic and may be made of other materials, it is in this example formed from a single layer of P.T.F.E. A suitable P.T.F.E. tube may be produced employing the method set forth in U.S. Pat. No. 2,752,637 issued July 3, 1956 and assigned to the same assignee as the present application.

Figure 4:
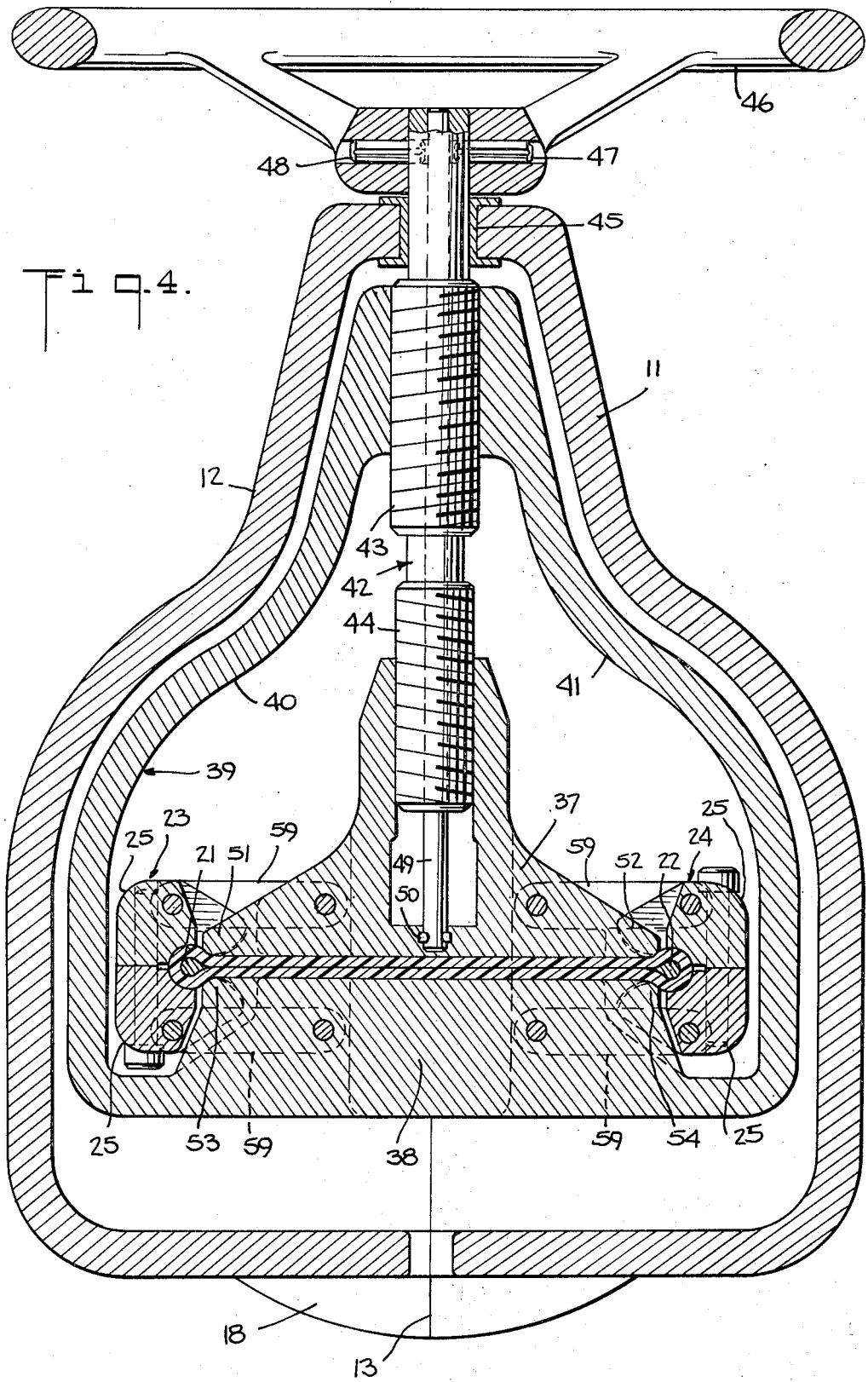
FIG. 4 is a transverse sectional view taken along the line 4—4 in FIG. 3 with the valve closed.
Figure 6:
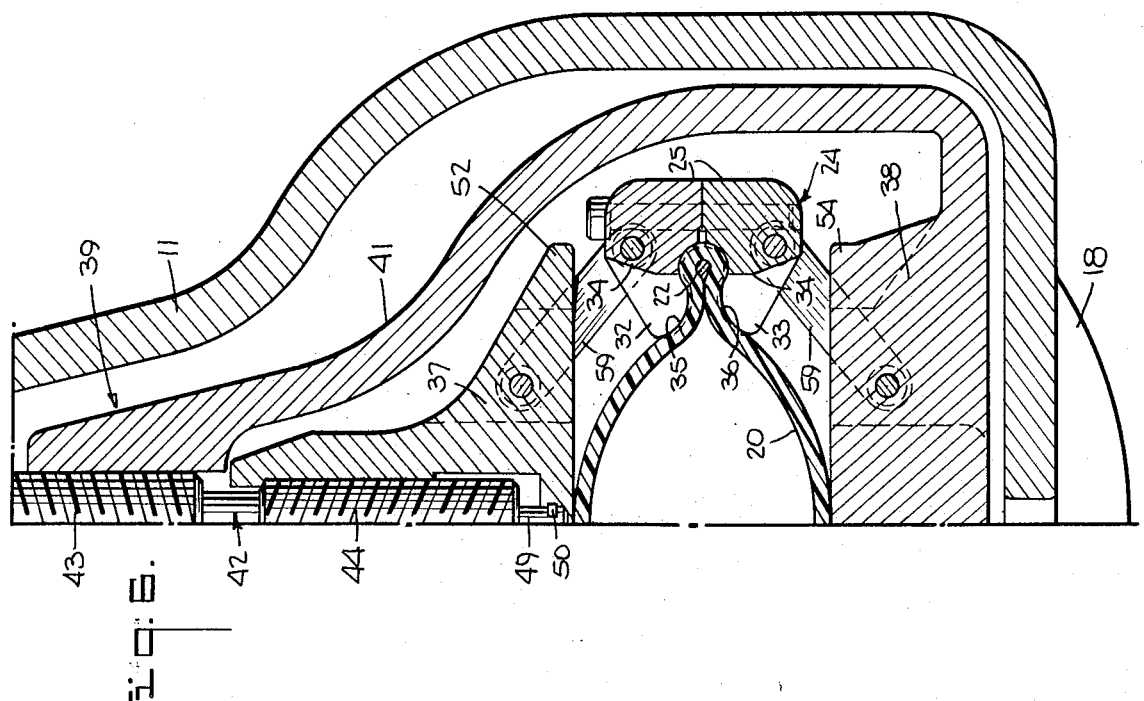
FIG. 6 is a partial sectional view similar to FIG. 4 but showing the valve in open condition.
Figure 5:
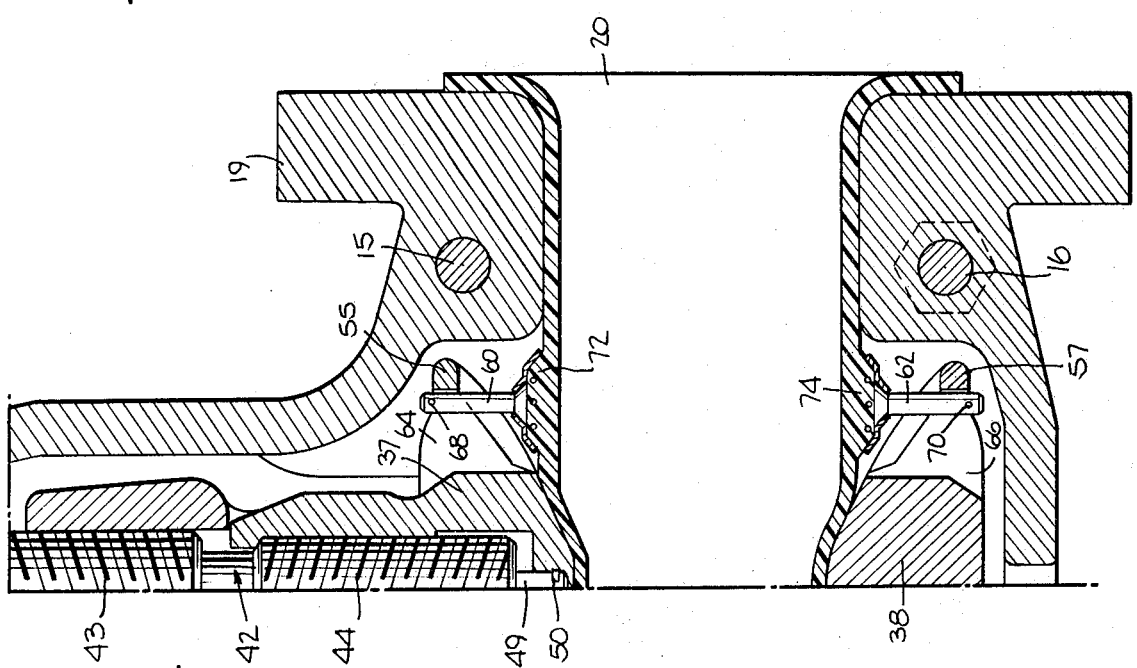
FIG. 5 is a partial view similar to FIG. 3 showing the valve in open condition.

Disposed at opposite edges of the tube 20, on the interior thereof are filler pieces 21 and 22, best seen in FIG. 4. These pieces must be fluid impervious elements. The filler piece should have a smoothly curving contour to which the tube may be conformed by wrapping therearound without inducing a crack in the tube wall. As described in my aforesaid copending application, the filler piece preferably is in the form of a cylinder with a directrix of substantially tear-drop shape such that the piece has substantially a featheredge at the point where the tube wall comes together. It is generally trapezoidal in outline and is installed in the tube such that when the tube is wrapped around the filler piece the featheredge faces radially inwardly of the tube. The filler piece is preferably produced from sintered P.T.F.E. resin fabricated by any known method.

To permanently constrain the side edge of the tube around the filler piece, there are provided the clamping devices 23 and 24. These clamping devices 23 and 24 may be made up of identical halves 25 which, when secured together, form two substantially C-shape assemblies with the side edge of the tube being confined by the jaws of the C-shape assembly in sealing engagement with the filler piece. As best seen in FIG. 11, the clamp members 25 are provided with a counterbored through bore 26 and a tapped bore 27 on opposite sides thereof. Thus, when two of the members 25 are clamped together, face-to-face, the bore 26 in one member will receive a bolt which will thread into the threaded bore 27 in the mating member and vice versa.

Referring to both FIGS. 11 and 12, it will be observed that the edge clamp member 25 is provided with a cylindrical contour at 28 for embracing the tube wall. Arcuate ribs 29 and 30 are located in the cylindrical jaw region 28 as shown for developing localized pressure on the tube. A rabbet is provided at 31 in order to provide a gap as two of the members 25 are being brought together about the tube edge for avoiding pinching of the material of the tube between the members. Unlike the edge clamp members disclosed in my aforesaid copending application, the members 25 herein are provided with spaced parallel fingers 32 and 33 separated by the notch 34. In addition, the members 25 each have a smoothly rounded diverging mouth which when installed upon the tube faces the axis thereof, such mouth being provided by the surfaces 35 and 36 on the fingers 32 and 33, respectively. The purpose of the rounded diverging surfaces or mouth of the edge clamp members is to prevent crack inducing flexure of the tube during opening and closing of the valve. The cooperation of the rounded surfaces of the clamps with the sides of the tube wall can best be seen in FIG. 6 which shows the relationship of the parts with the valve in open position.

The valve includes a pair of compressor members 37 and 38 for adjustably constricting the remainder of the tube 20 between the clamps 23 and 24 for controlling the closing of the valve. As best seen in FIG. 4, the compressor member 38 is formed integral with a yoke 39. The yoke 39 is generally wishbone shape with the arms 40 and 41 following mirror symmetric S-curves. Valve manipulating means in the form of a threaded stem 42 having reversely threaded portions 43 and 44 is coupled to the yoke where the arms 40 and 41 converge. The coupling is accomplished through threaded engagement of the threaded portion 43 of the stem 42 in a threaded bore at the top of the yoke 39.

The threaded portion 44 of the stem 42 is threadedly engaged in a threaded bore in the compressor member 37. The upper end of the stem 42 passes through a bushing 45 at the top of the housing 10. A suitable hand wheel 46 may be secured to the top of the stem 42 with suitable shear pins 47 and 48 or other appropriate means.

The threaded sections 43 and 44 of the valve stem are oppositely threaded such that as the hand wheel 46 is rotated in the clockwise direction as viewed from above, the valve will be closed by causing the yoke to advance upward toward the top of the housing while causing the compressor 37 to travel down the stem. When the hand wheel 46 is manipulated in the reverse direction the valve will open through reverse operation of the component parts.

A rod 49 passing through a longitudinal bore through the valve stem 42 and staked at its lower end 50 to the compressor member 37 functions as an indicator to show the condition of the valve. Thus, it will be observed from FIG. 4 that the indicator rod 49 is completely recessed in the stem 42 with the valve fully closed. When the valve is opened the indicator rod 49 will advance upwardly through the valve stem 42 causing its upper end to project therefrom as a visible indication of the valve open condition.

Figure 1:
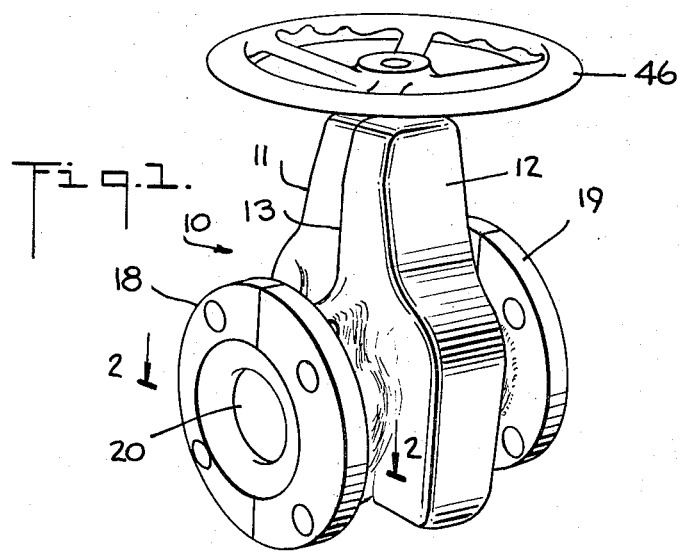
FIG. 1 is a perspective view of a constrictable tube valve embodying the present invention.
Figure 2:
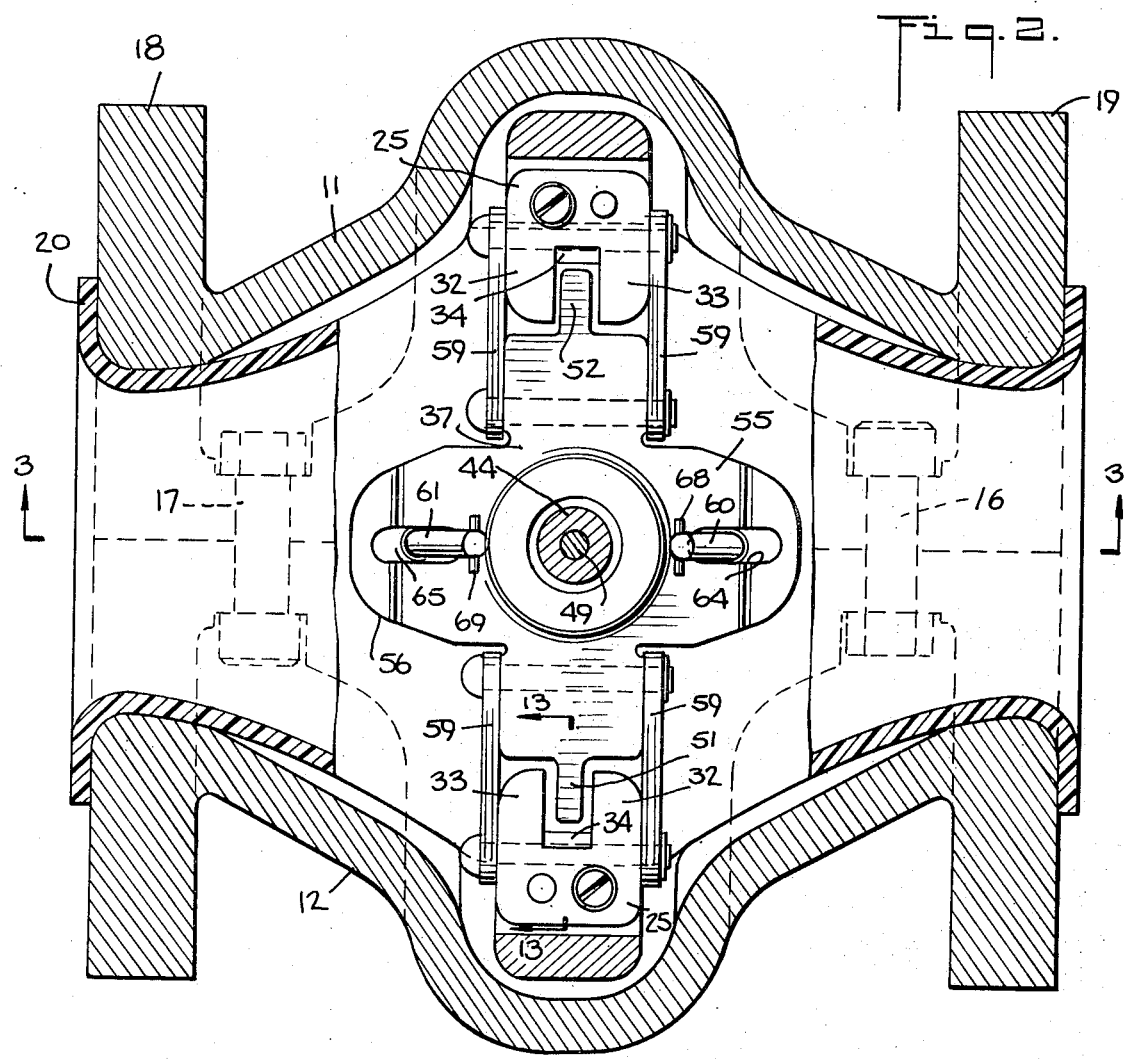
FIG. 2 is a horizontal longitudinal sectional view taken along the line 2—2 in FIG. 1 with the valve closed.

In order to ensure complete edge-to-edge sealing of the valve upon its closure, particularly in view of the gradually curving surfaces 35 and 36 of the edge clamps, the compressor members 37 and 38 are arranged to extend across the tube in overlapping relationship with respect to the corresponding edge clamps. As best seen in FIGS. 2, 4 and 12, the compressor members 37 and 38 each have a narrow lateral extension shown at 51, 52, 53 and 54 on opposite ends reaching laterally relative to the tube into the space between the corresponding fingers 32 and 33 of a corresponding edge clamp member 25.

The cooperation when the valve is closed between the lateral extensions of the compressor members, the edge clamps and the clamped edges of the tube 20 can best be seen in FIG. 12. Only the end 51 of compressor member 37 is shown as exemplary relative to one of the clamps 25 with the filler piece 21 shown in phantom lines. While it is intended to show the relationship with the valve closed, for clarity the compressor member 37 has been shown displaced vertically with its edge following the phantom line 51a. The normal inward movement of the edge clamp has been ignored so that the clamp appears in its closed valve position.

Notice should be had of the curved surfaces designated by the radii 51b and 51c. The radius 51b may be slightly less than radius 51c while the two surfaces substantially coincide when the valve is closed. Allowing for the thickness of the wall of the tube 20, it will be seen that the end of the compressor member reaches laterally relative to the tube substantially up to a point overlying the proximal portion of the filler piece with the surface 51b engaging the tube wall to compress it against the concave surface of the filler piece. The finger 33 typically straddles the extension 51 extending radially inwardly of the tube beyond said point applying sealing pressure at least to a point inwardly or overlapping the point where the compressor member leaves off. This overlapping relationship ensures that there is no path through the valve for leakage when the valve is intended to be closed. The illustrated relationship is typical being the same for all of the edge clamp fingers and compressor extensions. It should also be understood that the spacing or clearance between the walls of the notch in the edge clamp member and the extension of the compressor, in the valve closed position, is not critical.

It should be apparent from a consideration of the valve structure that the constrictable tube 20 must repeatedly accommodate itself during manipulation of the valve to a transition from the cylindrical end portions to the flattened central region. It is important that creasing or overstressing of the tube wall be avoided if the valve is to have appreciable cycling life. Therefore, as another feature of the present invention the compressor members 37 and 38 include the wings 55, 56, 57 and 58 extending longitudinally of the valve and presenting a smooth curving surface for engaging the wall of the tube 20 to ensure a gradual transition between the normally circular ends of the tube and the constricted portion.

Rotation of the compressor members 37 and 38 relative to the tube 20 is avoided by interconnecting the compressor members with the edge clamp members 25 through the links 59. The links 59 should be freely articulable and may even be slotted at their ends to provide some lost motion.

Figure 3:
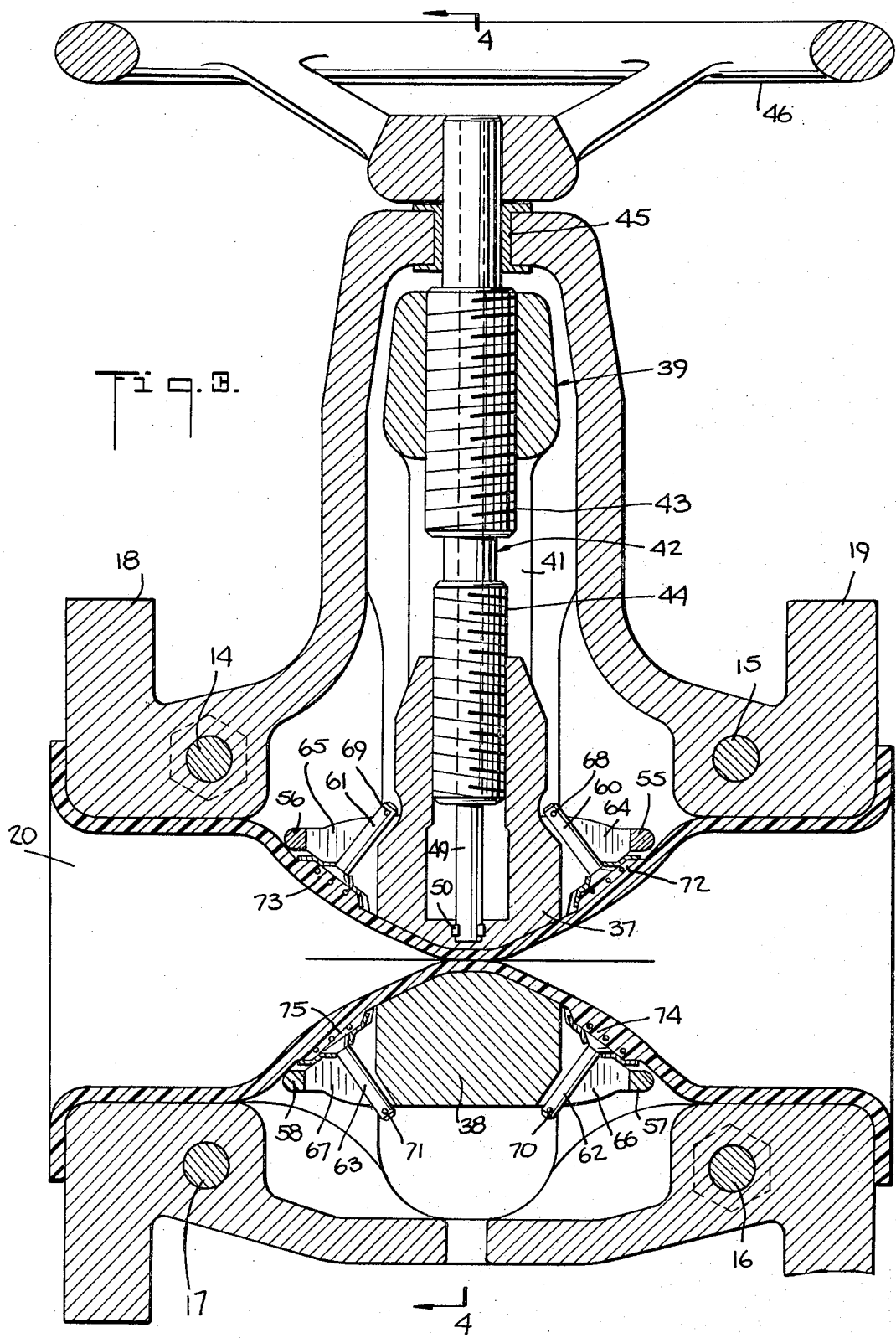
FIG. 3 is a vertical longitudinal sectional view taken along the line 3—3 in FIG. 2 with the valve closed.

In order to ensure opening of the valve when internal fluid pressure is inadequate, means are provided joining the tube 20 to the wings 55, 56, 57 and 58. As best seen in FIG. 3, this means takes the form of a plurality of interconnecting members 60, 61, 62 and 63 secured at one end to the tube 20 and coupled at their other ends each to a different one of the wings 55 through 58, respectively. As seen in the drawings, the wings are provided with slots 64, 65, 66 and 67 through which the interconnecting members 60 to 63 pass. The interconnecting members are in the form of pins through which corresponding cross pins are passed to function as retaining means engaging the corresponding wings. The cross pins are identified by the numerals 68, 69, 70 and 71. It will be observed that the interconnecting members 60, 61, 62 and 63 are secured to the tube 20 in pairs in substantially diametral opposition at locations spaced longitudinally from the region contacted by the compressor members 37 and 38. By comparing FIG. 3 with FIG. 5, it will be observed that the interconnection between the tube 20 and the corresponding wings 55 through 58 is characterized by lost motion.

For the purpose of securing the interconnecting members to the tube 20, the tube is provided with two bosses 72 and 73 spaced apart along a longitudinal element on one side of the tube and two further bosses 74 and 75 similarly spaced along a longitudinal element on the diametrically opposite side of the tube such that pairs of said bosses are in substantially diametral opposition. The pair 72, 74 is located on one side of the region flattened during operation of the valve while the pair 73, 75 is located on the opposite side of said region.

All of the interconnecting members 60, 61, 62 and 63 may be identical. A typical assembly is illustrated in FIGS. 8, 9 and 10, wherein the member is shown as consisting of a pin 76 with a radially enlarged head 77. The means for attaching the pin 76 to the boss 72 comprises a metal cap 78 overlying the boss and attached thereto with a plurality of pins 79. The pin head 77 is captured between the boss and the cap with the pin projecting through an aperture 80 in the cap 78. Some play should be allowed between the pin and the cap so that the pin is free to articulate relative to the boss 72. It is to be understood that various other arrangements may be employed for interconnecting the tube wall with the corresponding compressor member and the arrangement illustrated herein is intended only as an example.

While various methods may be employed for producing the tube 20 with the required bosses thereon, it is presently preferred to extrude the tube with a generally uniform wall thickness except for the two ribs 81 and 82 as shown in FIG. 7 of greater radial dimension extending longitudinally of the tube on the radially outer surface thereof. The ribs 81 and 82 are located along diametrically opposite elements of the tube. After sintering the resin, assuming that the resin is P.T.F.E., longitudinal sections of the ribs are removed by machining in order to leave the bosses 72 through 75. Thereupon, the connecting elements may be affixed to the corresponding bosses.

Materials such as P.T.F.E. resin experience some cold flow under compressive stress. In order to ensure that the valve will maintain its sealing closure when desired, the yoke element 39 has its arms 40 and 41 so dimensioned as to provide some elasticity and thereby be sufficiently limber to deform elastically whenever the valve is closed. In this way sealing pressure can be maintained through a wide range of temperature and pressure variation. This also explains the choice of wishbone configuration for the yoke. Such configuration lends itself to providing the requisite limberness.

Under certain conditions of sealing, it may also be found advantageous to introduce elasticity in the extending ends of the compressor members. Such modification is shown in FIGS. 13 and 14 of the drawings to which attention is now directed. As seen therein, the extreme end portions 83 and 84 (it may be assumed that the opposite ends of the compressors are similarly formed) are provided with a resilient foot for resiliently engaging the tube 20 in the tube constricting direction for maintaining sealing pressure on the tube over a wide range of temperature and pressure. It will be seen from the drawings that the edge clamps 25a are similar to those previously described although the notch is deeper terminating in a plane generally passing through the axis of the cylindrical portion of the jaw rather than as shown in FIG. 12. FIG. 13 shows the arrangement in closed position while FIG. 14 shows the arrangement at the moment that the foot is about to contact the tube. It will be seen that the foot extends further around the folded edge of the tube than the rigid compressor extension shown in FIG. 12.

Having described the presently preferred embodiment of the invention, it should be understood that various changes in construction may be made without departing from the true spirit of the invention as defined in the appended claims.

What is claimed is:

1. A valve of the type wherein a tube of flexible material is flattened to form a barrier to the flow of fluid material therethrough, comprising in combination a pair of edge clamps securing in substantially permanent folded fluid sealing embrace opposite edges of said tube, and a pair of compressor members for adjustably constricting the remainder of said tube between said clamps for controlling the closing of said valve, characterized in that said compressor members extend across said tube in overlapping relationship with respect to said edge clamps to ensure complete edge-to-edge sealing upon closure of said valve.

2. A valve according to claim 1, characterized in that said edge clamps are provided with notches on both sides of said folded tube, and portions of said compressor members act against said tube within said notches.

3. A valve according to claim 1, characterized in that each of said edge clamps is notched on both sides of said folded tube providing spaced parallel fingers extending radially inwardly of said tube on each side thereof, and said compressor members each have a narrow lateral extension on opposite ends reaching laterally relative to said tube into the space between the corresponding fingers of a corresponding edge clamp.

4. A valve according to claim 1, characterized in that said tube is folded around a smoothly contoured filler piece within each edge clamp, and said compressor members each have a narrow lateral extension on opposite ends reaching laterally relative to said tube substantially up to a point overlying the proximal portion of said filler piece, and each of said edge clamps is notched providing spaced parallel fingers which straddle the corresponding lateral extension of said compressor members, the fingers of said clamps extending radially inwardly of said tube beyond said point.

5. A valve according to claim 1, characterized in that said edge clamps each have a generally C-shaped jaw embracing said tube with a smoothly rounded diverging mouth facing the axis of the tube for preventing crack inducing flexure of said tube during opening and closing of said valve.

6. A valve according to claim 5, characterized in that said compressor members extend in overlapping relation to said edge clamps at least beyond said mouth of said jaws to the nearest point of sealing embrace of said tube established by said clamps.

7. A valve according to claim 1, wherein the extreme end portions of said compressor members at each edge of said tube are provided with means for resiliently engaging the tube in the tube constricting direction for maintaining fluid sealing pressure on said tube over a wide range of temperature and pressure.

8. A valve of the type wherein a tube of flexible plastic is flattened to form a barrier to the flow of fluid material therethrough, comprising in combination a pair of compressor members for adjustably flattening the tube transversely thereof, one of said compressor members being disposed on each side of said tube, a yoke encircling said tube and joined to one of said compressor members, means coupled to said yoke at a point opposite said one compressor member and also coupled to said other compressor member for manipulating both the latter and said yoke in reciprocal directions to cause said compressor members to approach each other for closing said valve in one direction and to separate to open the valve in the other direction, said yoke being formed sufficiently limber to deform elastically whenever said valve is closed for maintaining fluid sealing pressure on said tube through a wide range of temperature and pressure.

9. A valve according to claim 8, wherein said yoke is generally wishbone shape with the arms following mirror symmetric S-curves, said manipulating means being coupled to said yoke where the arms converge, the diverging ends of said arms being joined to said one compressor member.

10. A valve of the type wherein a tube of flexible material is flattened to control the flow of fluid material therethrough, comprising in combination a tube of flexible generally crack sensitive plastic, a pair of edge clamps securing opposite edges of said tube in substantially permanent folded fluid sealing embrace, and a pair of compressor members for adjustably constricting the remainder of said tube between said clamps, said compressor members having surface means for ensuring crease-free flexure of said tube during opening and closing of said valve, said surface means comprising narrow lateral extensions from said compressor members reaching laterally relative to said tube so as to overlap said edge clamps, and said edge clamps being provided with jaws embracing said tube with rounded diverging walls co-extensive with said overlaps for guiding said tube in a smooth curve during opening and closing of said valve.

11. A valve of the type wherein a tube of flexible material is flattened to control the flow of fluid material therethrough, comprising in combination a tube of flexible generally crack sensitive plastic, a pair of edge clamps securing opposite edges of said tube in substantially permanent folded fluid sealing embrace, a pair of compressor members for adjustably constricting the remainder of said tube between said clamps, said compressor members having surface means for ensuring crease-free flexure of said tube during opening and closing of said valve, said surface means comprising wings extending from both sides of each compressor member longitudinally of said valve with a smooth curving surface providing for a gradual transition between the normally circular ends of said tube and the constricted portion, and means joining said tube to said wings of the compressor members for effecting positive opening of said valve.

12. A valve according to claim 11, wherein said means joining the tube to said wings comprise a plurality of interconnecting members secured to said tube.

13. A valve of the type wherein a tube of flexible material is flattened to control the flow of fluid material therethrough, comprising in combination a tube of flexible generally crack sensitive plastic, a pair of edge clamps securing opposite edges of said tube in substantially permanent folded fluid sealing embrace, a pair of compressor members for adjustably constricting the remainder of said tube between said clamps, said compressor members having surface means for ensuring crease-free flexure of said tube during opening and closing of said valve, said surface means comprising wings extending from both sides of each compressor member longitudinally of said valve with a smooth curving surface providing for a gradual transition between the normally circular ends of said tube and the constricted portion, and a plurality of interconnecting members secured at one end to said tube and coupled at their other ends to a different one of said wings, said wings being slotted and said interconnecting members being coupled thereto by passing through the slotted region and being provided with retaining means engaging the corresponding wing.

14. A valve of the type wherein a tube of flexible material is flattened to control the flow of fluid material therethrough, comprising in combination a tube of flexible generally crack sensitive plastic, a pair of edge clamps securing opposite edges of said tube in substantially permanent folded fluid sealing embrace, a pair of compressor members for adjustably constricting the remainder of said tube between said clamps, said compressor members having surface means for ensuring crease-free flexure of said tube during opening and closing of said valve, and means for coupling said tube to said compressor members for positive expansion of said tube when the compressor members are moved apart, said last mentioned means comprising a plurality of separate interconnecting members secured to said tube in pairs in substantially diametral opposition at locations spaced longitudinally from the region contacted by said compressor members, said interconnecting members being coupled to said compressor members through an arrangement having lost motion.

15. A valve of the type wherein a tube of flexible material is flattened to form a barrier to the flow of fluid material therethrough, comprising in combination a tube of flexible plastic, a pair of compressor members for adjustably constricting said tube transversely thereof, said compressor members having wings extending from both sides of each compressor member longitudinally of said valve with a smooth curving surface providing for a gradual transition between the normally circular ends of said tube and the constricted portion for ensuring relatively stress-free flexure of said tube during opening and closing of said valve, and means joining said tube to said wings of the compressor members for effecting positive opening of said valve.

16. A valve according to claim 15, wherein said means joining the tube to said wings comprise a plurality of interconnecting members secured to said tube.

17. A valve of the type wherein a tube of flexible material is flattened to form a barrier to the flow of fluid material therethrough, comprising in combination a tube of flexible plastic, a pair of compressor members for adjustably constricting said tube transversely thereof, said compressor members having wings extending from both sides of each compressor member longitudinally of said valve with a smooth curving surface providing for a gradual transition between the normally circular ends of said tube and the constricted portion for ensuring relatively stress-free flexure of said tube during opening and closing of said valve, and a plurality of interconnecting members secured at one end to said tube and coupled at their other ends each to a different one of said wings, said wings being slotted and said interconnecting members being coupled thereto by passing through the slotted region and being provided with retaining means engaging the corresponding wing.

18. A valve of the type wherein a tube of flexible material is flattened to form a barrier to the flow of fluid material therethrough, comprising in combination a tube of flexible plastic, a pair of compressor members for adjustably constricting said tube transversely thereof, said compressor members having wings extending from both sides of each compressor member longitudinally of said valve with a smooth curving surface providing for a gradual transition between the normally circular ends of said tube and the constricted portion for ensuring relatively stressfree flexure of said tube during opening and closing of said valve, and means for coupling said tube to said compressor members for positive expansion of said tube when the compressor members are moved apart, said last mentioned means comprising a plurality of separate interconnecting members secured to said tube in pairs in substantially diametral opposition at locations spaced longitudinally from the region contacted by said compressor members, said interconnecting members being coupled to said compressor members through an arrangement having lost motion.

19. A valve of the type wherein a tube of flexible material is flattened to form a barrier to the flow of fluid material therethrough, comprising in combination a tube of flexible plastic, the outer surface of said tube being formed with a pair of bosses located longitudinally spaced from the region which is flattened on one side thereof in substantially diametral opposition, a pair of compressor members for adjustably flattening said tube transversely thereof, two interconnecting pins each with a radially enlarged head, a separate metal cap overlying each of said bosses and attached thereto, a corresponding one of said pins having its head captured between a corresponding one of said bosses and its overlying cap with said pin projecting through an aperture in said cap, and means joining the projecting ends of said pins articularly to the adjacent compressor member for effecting positive expansion of said tube when the compressor members are moved apart.

20. A valve of the type wherein a tube of flexible material is flattened to form a barrier to the flow of fluid material therethrough, comprising in combination a tube of flexible plastic, the outer surface of said tube being formed with a pair of bosses located longitudinally spaced from the region which is flattened on one side thereof in substantially diametral opposition, a pair of compressor members for adjustably flattening said tube transversely thereof, two interconnecting elements, means attaching one end of each of said interconnecting elements to a corresponding one of said bosses with freedom to articulate relative thereto, and means joining the opposite ends of said elements articularly to the adjacent compressor member for effecting positive expansion of said tube when the compressor members are moved apart.

* * * * *